(12) United States Patent
Watanabe (10) Patent No.: US 7,653,378 B2
(45) Date of Patent: Jan. 26, 2010

(54) AUTHENTICATION SYSTEM FOR MOBILE TERMINAL HAVING ELECTRONIC MONEY FUNCTION

(75) Inventor: Yoshiaki Watanabe, Asaka (JP)

(73) Assignee: Fujifilm Corporation, Tokyo (JP)

( * ) Notice: Subject to any disclaimer, the term of this patent is extended or adjusted under 35 U.S.C. 154(b) by 568 days.

(21) Appl. No.: 11/334,358

(22) Filed: Jan. 19, 2006

(65) Prior Publication Data

US 2006/0160525 A1 Jul. 20, 2006

(30) Foreign Application Priority Data

Jan. 20, 2005 (JP) ............................. 2005-012692

(51) Int. Cl.
*H04M 1/66* (2006.01)
(52) U.S. Cl. ...................... 455/410; 455/411; 455/414.1
(58) Field of Classification Search .......... 455/405–415
See application file for complete search history.

(56) References Cited

FOREIGN PATENT DOCUMENTS

JP 2002-95042 A 3/2002

*Primary Examiner*—Patrick N Edouard
*Assistant Examiner*—Dai A Phuong
(74) *Attorney, Agent, or Firm*—Birch, Stewart, Kolasch & Birch, LLP (57) ABSTRACT

A user of a mobile phone photographs himself/herself, and sends a password to an authentication server. After the authentication server authenticates the user, the mobile phone stores the photographed image of the user in a memory accessible only by authentication software. When the authentication software detects a billing apparatus at the time the user makes a purchase, the image is read from the memory and displayed while an indicator is on. A store clerk can confirm whether the person carrying the mobile phone is the legitimate user by judging whether the face image matches the person and whether the indicator is on at the same time.

11 Claims, 5 Drawing Sheets

AUTHENTICATION SYSTEM FOR MOBILE TERMINAL HAVING ELECTRONIC MONEY FUNCTION

BACKGROUND OF THE INVENTION

1. Field of the Invention

The present invention relates to a mobile terminal having an electronic money function, an authentication apparatus for the mobile terminal, a billing apparatus, an authentication system using the apparatuses and the terminal, a processing method used in the mobile terminal, an authentication method used in the authentication apparatus, a billing method used in the billing apparatus, and programs for causing computers to execute those methods.

2. Description of the Related Art

An electronic money system having high security against forgery and enabling off-line transactions has been developed recently. An electronic money system refers to a system in which payment is made by transferring information on electronic money (electronic currency that is equivalent to paper and metal currency in circulation) stored in an IC chip of an IC card (also called an electronic money card).

A system has also been proposed in which an IC chip storing information on electronic money (hereinafter simply referred to as e-money) is installed in a mobile phone to enable the mobile phone to have an e-money function and payment is made by using the mobile phone as a wallet. By storing e-money information in a mobile phone carried by a user at any time, the user can make a purchase without using cash, even in the case where the user has forgotten to bring his/her wallet.

On the other hand, if the mobile phone is lost or stolen, the e-money information is also lost or stolen, raising the possibility of e-money being used by a malicious third person. In reality, users are thus not willing to use mobile phones having the e-money function unreservedly.

For this reason, a system has been proposed in Japanese Unexamined Patent Publication No. 2002-095042 for confirming the legitimate user of a mobile phone. In this system, an authentication server used for user authentication stores a face image of the owner of a mobile phone, and the face image of the owner is obtained from the authentication server at the time of user authentication using the mobile phone. The face image is then displayed on the mobile phone to confirm the legitimate user. According to this system, a store clerk can confirm the legitimate user of the mobile phone, and illegal use of e-money by a third person can be prevented through use of this system when the mobile phone having the e-money function is used.

However, in the system described in Japanese Unexamined Patent Publication No. 2002-095042, if a third person displays his/her image on the mobile phone pretending that he/she is communicating with the server, the person using the mobile phone seems to agree with the person using e-money. Therefore, the person may use e-money. Furthermore, since communication with the server is necessary at the time of user authentication, the system in Japanese Unexamined Patent Publication No. 2002-095042 cannot be used in a place where radiowaves cannot reach or are disrupted.

SUMMARY OF THE INVENTION

The present invention has been conceived based on consideration of the above circumstances. An object of the present invention is therefore to securely prevent illegal use of e-money by a third person.

An authentication system of the present invention is an authentication system comprising a mobile terminal having an e-money function, an authentication apparatus used for user authentication regarding the mobile terminal, and a billing apparatus used for billing by using the mobile terminal. In the authentication system, the mobile terminal comprises:

imaging means for obtaining an image of a subject by photography;

first storage means where e-money information is read from and written in by information reading writing means;

mobile terminal communication means for carrying out various kinds of communication;

mobile terminal input means for receiving input of various kinds of instructions by a user;

mobile terminal display means for carrying out various kinds of display;

second storage means accessible only by predetermined application software;

warning means for carrying out warning through detection of the information reading writing means by the predetermined application software; and mobile terminal control means for allowing photography of the user by the imaging means and input of a password, for sending the password to the authentication apparatus, for storing the photographed image in the second storage means in the case where the authentication apparatus has authenticated the user, for displaying the image stored in the second storage means on the display means and for carrying out the warning by the warning means in the case where the control means has detected the information reading writing means, according to the predetermined application software. The authentication apparatus comprises:

authentication apparatus communication means for carrying out various kinds of communication; and authentication apparatus control means for carrying out authentication of a person carrying the mobile terminal by the password in the case where the password has been received from the mobile terminal, and for sending information representing a result of the authentication to the mobile terminal. The billing apparatus comprises:

billing apparatus input means for inputting various kinds of information;

the information reading writing means for reading and writing the e-money information from and in the mobile terminal; and billing means for carrying out billing based on the e-money information only in the case where input for allowing the billing is received from the billing apparatus input means.

A mobile terminal of the present invention is a mobile terminal used in the authentication system of the present invention, and the mobile terminal comprises:

imaging means for obtaining an image of a subject by photography;

first storage means where e-money information is read from and written in by information reading writing means;

communication means for carrying out various kinds of communication;

input means for receiving input of various kinds of instructions by a user;

display means for carrying out various kinds of display;

second storage means accessible only by predetermined application software;

warning means for carrying out warning through detection of the information reading writing means by the predetermined application software; and control means for allowing photography of the user by the imaging means and input of a password from the input means, for sending the password to the authentication apparatus by using the communication means, for storing the photographed image in the second storage means in the case where the authentication apparatus has authenticated the user, for displaying the image stored in the second storage means on the display means and for carrying out the warning by the warning means in the case where the control means has detected the information reading writing means, according to the predetermined application software.

In the mobile terminal of the present invention, the control means may send the image to the authentication apparatus so that the control means can store the image in the second storage means in the case where the authentication apparatus has judged the image to satisfy a predetermined condition.

In the mobile terminal of the present invention, the control means may send the image to the authentication apparatus so that the control means can store a processed image having been processed by the authentication apparatus for satisfying a predetermined condition in the second storage means in the case where the processed image has been received from the authentication apparatus.

An authentication apparatus of the present invention is an authentication apparatus used in the authentication system of the present invention, and the authentication apparatus comprises:

communication means for carrying out various kinds of communication; and control means for carrying out authentication of a person carrying the mobile terminal of the present invention by a password in the case where the password has been received from the mobile terminal, and for sending information representing a result of the authentication to the mobile terminal.

The authentication apparatus of the present invention may further comprise judgment means for judging whether a predetermined first condition is satisfied by an image obtained by photography of the person carrying the mobile terminal in the case where the image has been received from the mobile terminal and for sending information representing a result of the judgment to the mobile terminal.

The authentication apparatus of the present invention may also comprise processing means for processing an image obtained by photography of the person carrying the mobile terminal so that the image satisfies a predetermined second condition in the case where the image has been received from the mobile terminal and for sending the image having been processed to the mobile terminal.

A billing apparatus of the present invention is a billing apparatus used in the authentication system of the present invention, and the billing apparatus comprises:

input means for inputting various kinds of information;

information reading writing means for reading and writing the e-money information from and in the mobile terminal of the present invention; and billing means for carrying out billing based on the e-money information in the case where input for allowing the billing is received from the input means.

A processing method of the present invention used in a mobile terminal is a processing method for a mobile terminal used in the authentication system of the present invention, and the mobile terminal comprises:

imaging means for obtaining an image of a subject by photography;

first storage means where e-money information is read from and written in by information reading writing means;

communication means for carrying out various kinds of communication;

input means for receiving input of various kinds of instructions by a user;

display means for carrying out various kinds of display;

second storage means accessible only by predetermined application software; and warning means for carrying out warning through detection of the information reading writing means by the predetermined application software. The processing method comprises the steps of:

allowing photography of the user by the imaging means and input of a password;

sending the password to the authentication apparatus;

storing the photographed image in the second storage means in the case where the authentication apparatus has authenticated the user;

displaying the image stored in the second storage means on the display means and carrying out the warning by the warning means in the case where the information reading writing means has been detected, according to the predetermined application software.

An authentication method of the present invention is a method for an authentication apparatus that has communication means used for various kinds of communication and is used in the authentication system of the present invention. The authentication method comprises the steps of:

carrying out authentication of the owner of the mobile terminal of the present invention by the password in the case where the password has been received from the mobile terminal; and sending information representing a result of the authentication to the mobile terminal.

A billing method of the present invention is a method for a billing apparatus used in the authentication system of the present invention. The billing apparatus comprises input means for inputting various kinds of information, and information reading writing means for reading and writing the e-money information from and in the mobile terminal of the present invention. The billing method comprises the step of:

carrying out billing based on the e-money information in the case where input for allowing the billing is received from the input means.

The processing method, the authentication method, and the billing method of the present invention may be provided as programs for causing computers to execute the methods.

According to the present invention, the mobile terminal obtains the image by photography of the user and receives input of the password according to the predetermined application software. The mobile terminal sends the password to the authentication apparatus, and the authentication apparatus carries out user authentication by judging whether the user of the mobile terminal is the legitimate user, based on the password. The authentication apparatus sends the information representing the authentication result to the mobile terminal, and the mobile terminal stores the image in the second storage means according to the predetermined application software in the case where the user has been authenticated.

Meanwhile, in the case where the user of the mobile terminal makes a purchase at a store wherein the billing apparatus is installed, if the mobile terminal detects presence of the information reading writing means according to the predetermined application software, the terminal displays the image stored in the second storage means and carries out the warning by the warning means. A clerk in the store can confirm whether the user of the mobile terminal has been authenticated, through display of the image on the display means with the warning by the warning means. After the confirmation, the clerk caries out the input for billing permission from the billing apparatus input means. In this manner, the billing according to the e-money information in the mobile terminal can be carried out.

As has been described above, in the present invention, the image of the legitimate user of the mobile terminal is stored in the second storage means that can be accessed only by the dedicated application software, and the image stored in the second storage means is displayed while the warning is carried out according to the dedicated application software at the time of billing. Therefore, an operator (such as a store clerk) using the billing apparatus can confirm that a person bringing the mobile terminal is the legitimate user only in the case where the person matches the image displayed on the display means while the warning means is warning. Therefore, the warning means does not carry out the warning in the case where a photographed image is simply displayed or in the case where an image is displayed on the display means by application software such as i-appli® other than the predetermined application software. As a result, use of e-money by a third person pretending to be the legitimate user can be prevented.

Furthermore, by sending the image from the mobile terminal to the authentication apparatus for enabling the authentication apparatus to judge whether the image satisfies the predetermined condition and by sending the information representing the judgment result to the mobile terminal, an inappropriate image that does not satisfy the predetermined first condition for an authentication image can be prevented from being stored in the second storage means, preventing use of the inappropriate image for confirmation of the legitimate user at the time of billing.

In addition, by sending the image from the mobile terminal to the authentication apparatus for enabling the authentication apparatus to process the image so that the image can satisfy the predetermined condition and by sending the processed image to the mobile terminal, an inappropriate image that does not satisfy the predetermined second condition for an authentication image can be prevented from being stored in the second storage means, preventing use of the inappropriate image for confirmation of the legitimate user at the time of billing.

DESCRIPTION OF THE PREFERRED EMBODIMENT

Figure 1:
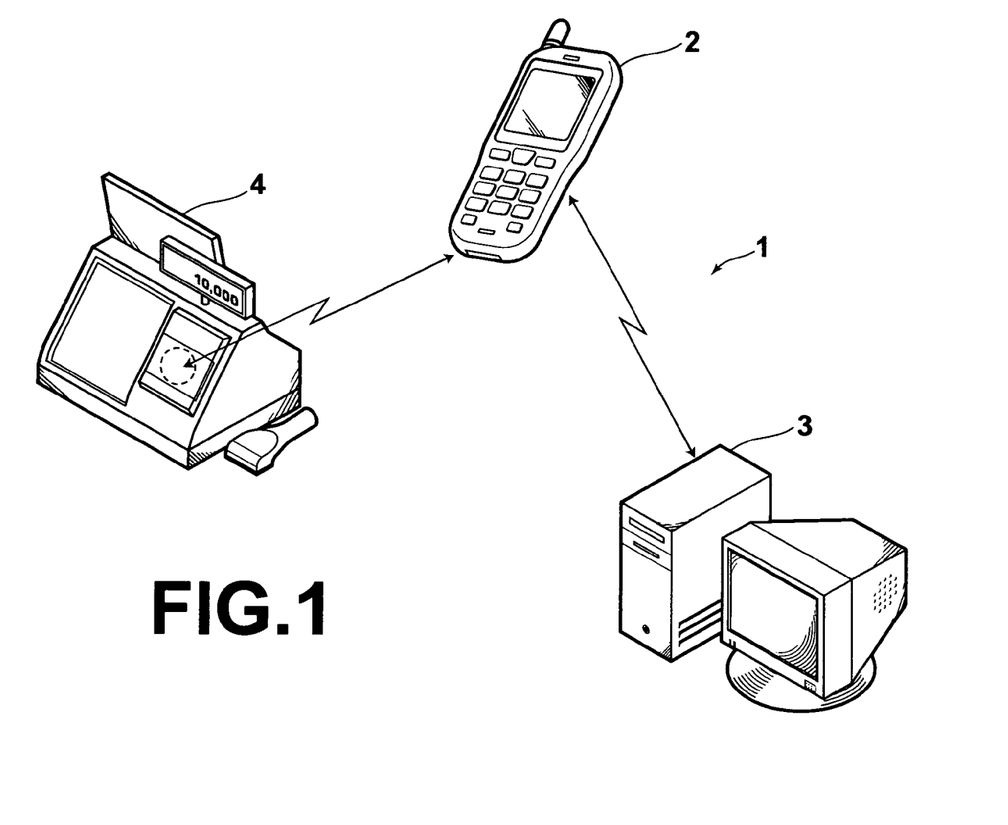
FIG. 1 shows an authentication system of an embodiment of the present invention.

Hereinafter, an embodiment of the present invention will be described with reference to the accompanying drawings. FIG. 1 shows an authentication system in the embodiment of the present invention. As shown in FIG. 1, an authentication system 1 in this embodiment comprises a mobile phone 2 having an e-money function, an authentication server 3 for authenticating a user of the mobile phone 2, and a billing apparatus 4 installed in a store for carrying out billing by using the e-money function of the mobile phone 2.

The authentication server 3 communicates with the mobile phone 2 via the Internet, and the billing apparatus 4 communicates with an IC chip installed in the mobile phone 2 in a contactless manner, as will be described later.

Figure 2:
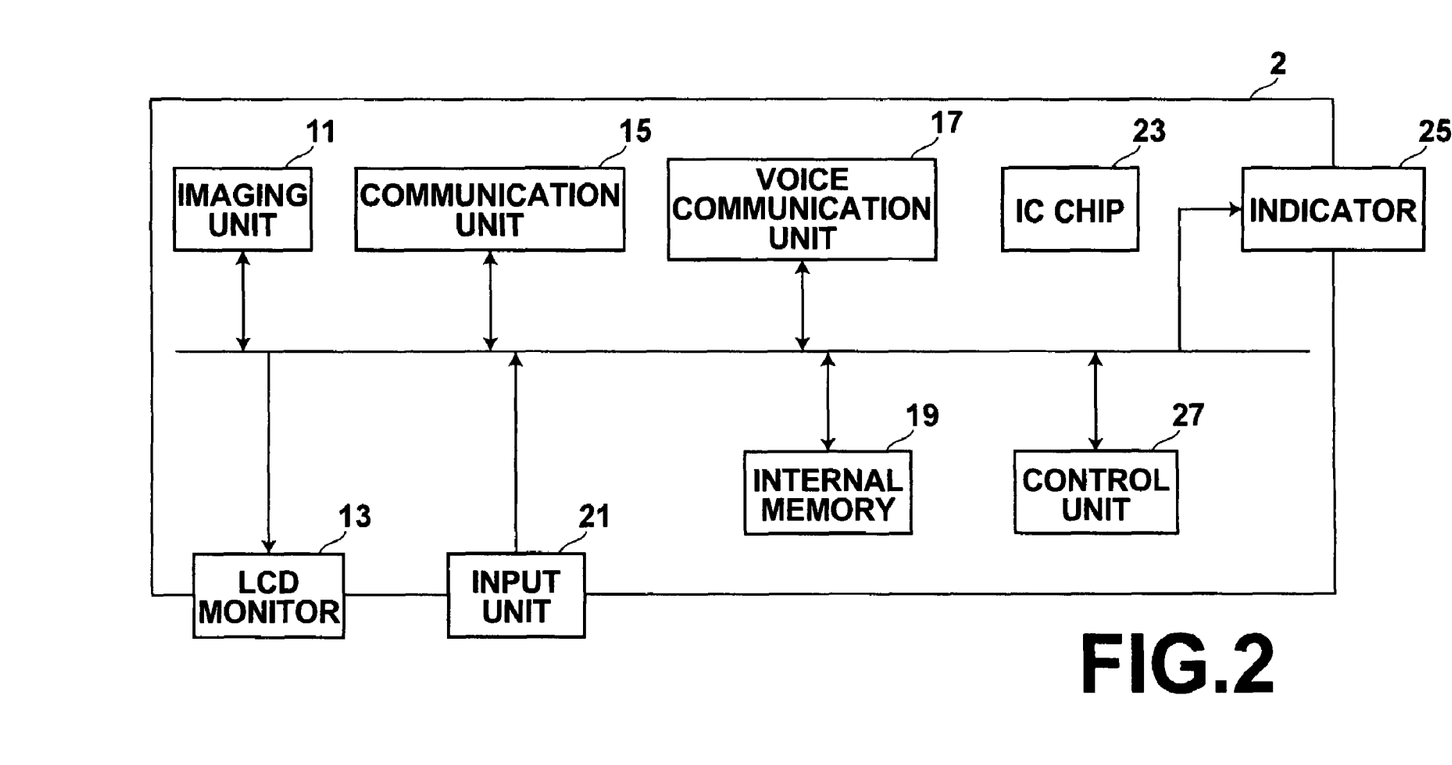
FIG. 2 is a block diagram showing the configuration of a mobile phone.

FIG. 2 is a block diagram showing the configuration of the mobile phone 2. As shown in FIG. 2, the mobile phone 2 comprises an imaging unit 11, a liquid crystal display monitor 13 (hereinafter referred to as the LCD monitor 13), a communication unit 15, a voice communication unit 17, an internal memory 19, an input unit 21, an IC chip 23, an indicator 25, and a control unit 27. The imaging unit 11 obtains image data representing an image, by photography. The LCD monitor 13 is used for various kinds of display such as image data display and menu display. The communication unit 15 transceives various kinds of information such as e-mail, image data, audio data, and application software via the Internet. The voice communication unit 17 carries out voice communication via a mobile phone network. The internal memory 19 stores image data obtained by photography or attached to e-mail, various kinds of downloaded information, information on various settings of the mobile phone 2, application software used for authentication described later (hereinafter referred to as the authentication software) and application software for control of the mobile phone 2. The input unit 21 comprises ten keys, a navigation key, and the like used for various kinds of input. The IC chip 23 stores e-money information. The indicator 25 is turned on by the authentication software at the time of billing processing, as will be described later. The control unit 27 controls the imaging unit 11, the LCD monitor 13, the communication unit 15, the voice communication unit 17, the IC chip 23, and the indicator 25.

The internal memory 19 has an area for storing image data and the like, an area for storing the information on various kinds of settings of the mobile phone 2, and an area that is accessible only by the authentication software (hereinafter referred to as a specific area).

The control unit 27 carries out procedures that will be described later, with the authentication server 3 and the billing apparatus 4 according to the authentication software.

Figure 3:
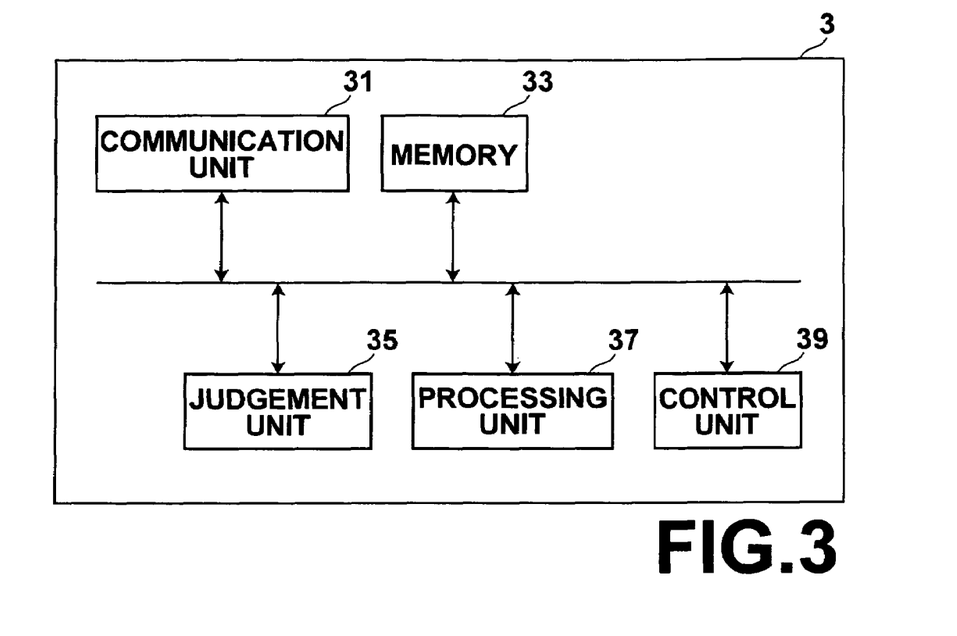
FIG. 3 is a block diagram showing the configuration of an authentication server.

FIG. 3 is a block diagram showing the configuration of the authentication server 3. As shown in FIG. 3, the authentication server 3 comprises a communication unit 31, a memory 33, a judgment unit 35, a processing unit 37, and a control unit 39. The communication unit 31 carries out communication via the Internet. The memory 33 comprises a hard disc or the like for storing various kinds of information such as a database for authenticating the user of the mobile phone 2 and application software for controlling the authentication server 3. The judgment unit 35 judges whether a face image received from the mobile phone 2 satisfies predetermined conditions appropriate for an image used for authentication. The processing unit 37 processes the face image so that the image satisfies the predetermined conditions as the authentication image. The control unit 39 controls the communication unit 31, the memory 33, the judgment unit 35, and the processing unit 37.

The judgment unit 35 judges whether the face image received from the mobile phone 2 satisfies all conditions comprising: (1) whether the face in the image is light enough for face recognition, (2) whether a face area has satisfactory resolution, (3) whether the face looks straight forward, (4) whether the face is at the center of the image, and (5) whether the eyes are not closed. A result of the judgment by the judgment unit 35 is sent to the mobile phone 2.

The processing unit 37 carries out image processing on the face image received from the mobile phone 2 so that the face image has desired lightness, and cuts the face area in the face image so that the face comes at the center of the face area. The processed image is sent to the mobile phone 2. The processing is carried out by the processing unit 37 in the case where the judgment unit 35 has judged that the condition(s) (1) and/or (4) is/are not satisfied.

Figure 4:
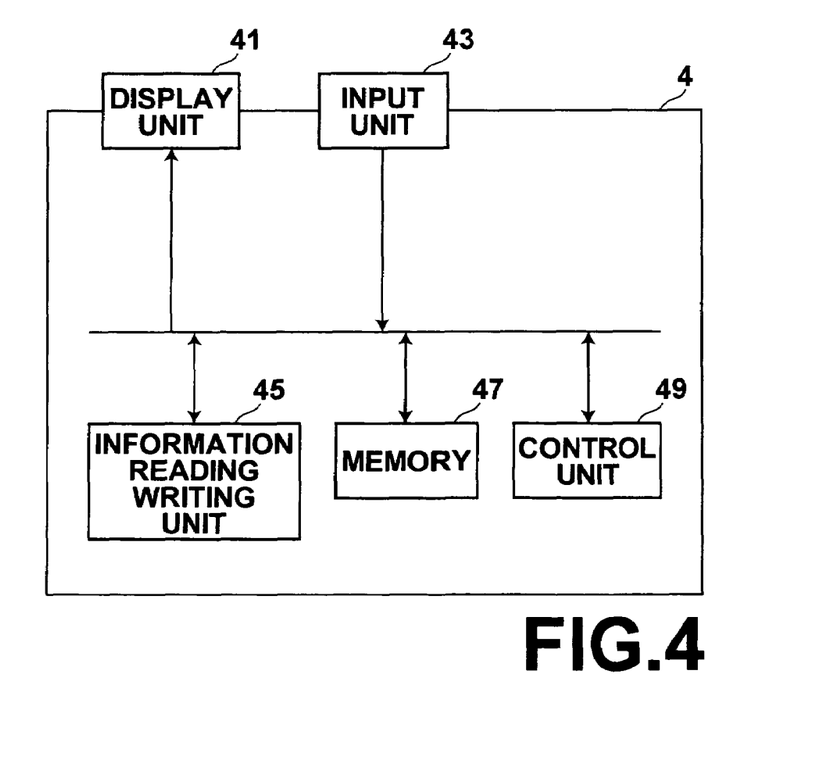
FIG. 4 is a block diagram showing the configuration of a billing apparatus.

FIG. 4 is a block diagram showing the configuration of the billing apparatus 4. As shown in FIG. 4, the billing apparatus 4 comprises a cash register installed in a store, and includes a display unit 41 for displaying the amount of sale or the like, an input unit 43 such as ten keys used or various kinds of input such as input of the amount of money, an information reading writing unit 45 for reading and writing the e-money information from and in the IC chip 23 of the mobile phone 2, a memory 47 for storing various kinds of information including application software for controlling the billing apparatus 4, and a control unit 49 for controlling the display unit 41 and the information reading writing unit 45.

The information reading writing unit 45 reads and writes the e-money information from and in the IC chip 23 in the contactless manner, when the mobile phone 2 is brought close to the information reading writing unit 45.

Processing carried out in this embodiment will be described next. A procedure for registering the face image of the user of the mobile phone 2 will be described first.

Figure 5:
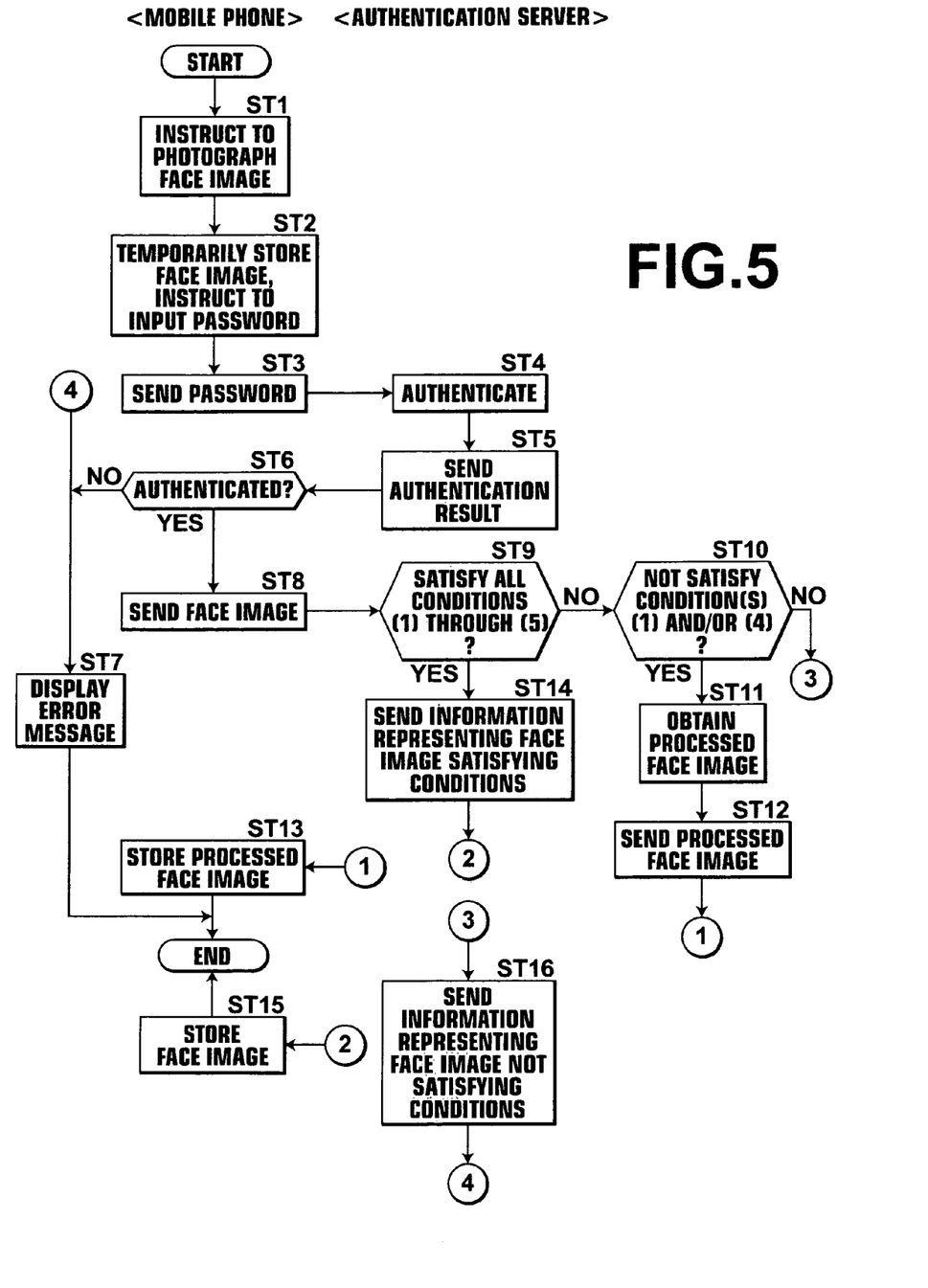
FIG. 5 is a flow chart showing a procedure carried out at the time of face image registration.

FIG. 5 is a flow chart showing the procedure carried out at the time of face image registration. The procedure starts when the user of the mobile phone 2 starts the authentication software, and the control unit 27 displays an instruction to photograph the face image of the user on the LCD monitor 13 (Step ST1). After the user has photographed the face image, the photographed face image is temporarily stored in the internal memory 19, and an instruction to input a password is displayed on the LCD monitor 13 (Step ST2). After the user inputs the password and an instruction to send the password, the control unit 27 sends the password to the authentication server 3 (Step ST3).

The authentication server 3 confirms whether the user is the legitimate user, based on the password sent from the mobile phone 2 (Step ST4), and sends a result of authentication to the mobile phone 2 (Step ST5).

The control unit 27 of the mobile phone 2 judges whether the user has been authenticated (Step ST6). If a result at ST6 is negative, the control unit 27 displays an error message on the LCD monitor 13 (Step ST7) to end the procedure. If the result at ST6 is affirmative, the face image is sent to the authentication server 3 (Step ST8).

The judgment unit 35 in the authentication server 3 judges whether the face image satisfies all the conditions (1) through (5) described above (Step ST9). If a result at ST9 is negative, the judgment unit 35 then judges whether the face image does not satisfy the condition(s) (1) and/or (4) above (Step ST10). If the face image does not satisfy the condition(s) (1) and/or (4), the processing unit 39 processes the face image to obtain the processed face image (Step ST11), and the processed image is sent to the mobile phone 2 (Step ST12).

The control unit 27 of the mobile phone 2 stores the processed face image in the specific area in the internal memory 19 (Step ST13) to end the procedure.

If the result at ST9 is affirmative, information representing that the face image satisfies all the conditions is sent to the mobile phone 2 (Step ST14). The control unit 27 of the mobile phone 2 stores the face image in the specific area in the internal memory 19 (Step ST15) to end the procedure.

If the face image satisfies the condition(s) (1) and/or (4), information representing that the face image does not satisfy all the conditions (1) through (5) is sent to the mobile phone 2 (Step ST16). The procedure then returns to Step ST7, and the control unit 27 displays an error message on the LCD monitor 13 to end the procedure. In this case, the user photographs his/her face again so that the face image satisfies all the conditions (1) through (5).

Figure 6:
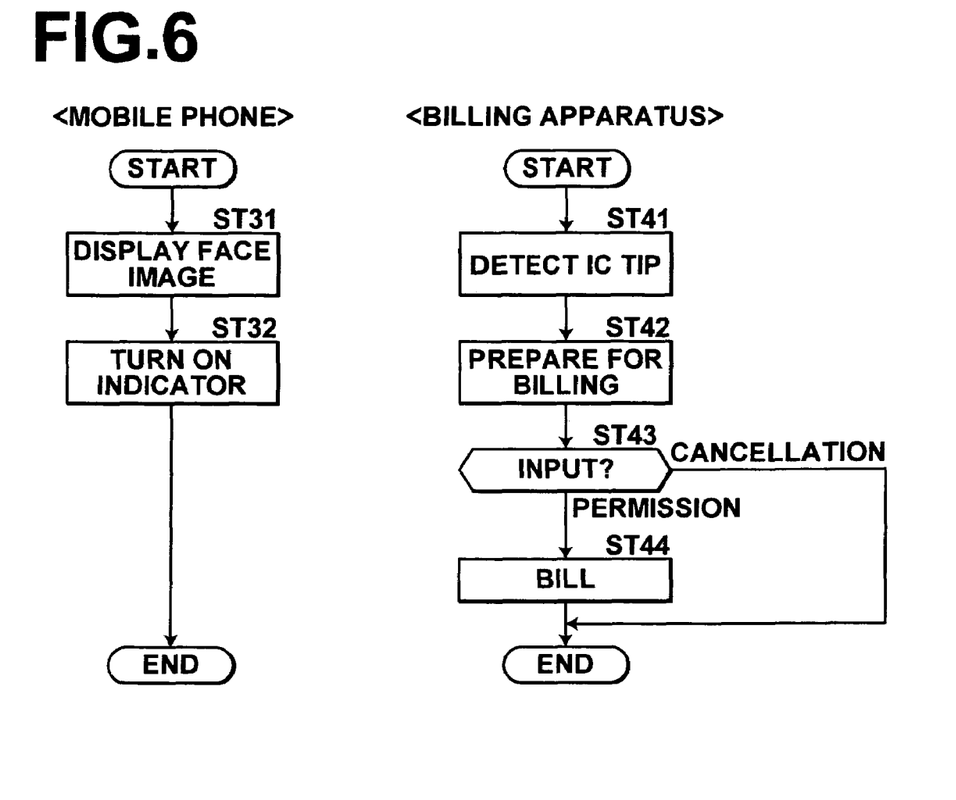
FIG. 6 is a flow chart showing a procedure carried out in billing processing.

A billing procedure carried out for purchase by the user of the mobile terminal 2 will be described next. FIG. 6 is a flow chart showing the procedure. The control unit 27 of the mobile phone 2 starts the procedure according to the authentication software when the user brings the mobile phone 2 close to the information reading writing unit 45 of the billing apparatus 4 to make a purchase. The face image (including the processed face image) stored in the specific area of the internal memory 19 is displayed on the LCD monitor 13 (Step ST31). The control unit 27 also turns on the indicator 25 according to the authentication software (Step ST32).

The billing apparatus 4 detects presence of the IC chip 23 of the mobile phone 2 (Step ST41), and prepares for billing (Step ST42). More specifically, an input made by a store clerk is received from the input unit 43 for representing permission or cancellation regarding the billing. In the case where the input represents permission to bill, the e-money information in the IC chip 23 is overwritten. In the case of cancellation, the billing apparatus 4 prepares to end the billing procedure.

The store clerk compares the face image displayed on the mobile phone 2 and the face of the person carrying the mobile phone 2 while checking whether the indicator has been turned on. In the case where the displayed face image matches the face of the person carrying the mobile phone 2 and the indicator is on at the same time, the person is the legitimate user of the mobile phone 2. However, in the case where the displayed face image does not agree with the face of the person, the person is not the legitimate user of the mobile phone 2. Even if the displayed face image matches the face of the person, the person may have simply displayed his/her face image or the face image is displayed by application software other than the authentication software in the case where the indicator 25 has not been turned on. Therefore, the person is not the legitimate user of the mobile phone 2.

Consequently, the store clerk makes the input representing permission to bill from the input unit 43 only in the case where the displayed face image matches the face of the person and the indicator 25 is on at the same time. Otherwise, the store clerk makes the input to cancel the billing.

The control unit 49 of the billing apparatus 4 judges whether the input is made from the input unit 43 (Step ST43), and carries out the billing in the case where the input represents permission to bill (Step ST44). In this manner, the e-money information in the IC chip 23 of the mobile phone 2 is overwritten by an amount of money as a result of subtraction of the amount of money for the purchase. In the case where the input represents cancellation, the procedure ends.

As has been described above, in this embodiment, the face image of the legitimate user of the mobile phone 2 is stored in the specific area in the internal memory 19 accessible only by the authentication software, and the face image stored in the specific area is displayed while the indicator 25 is on according to the authentication software at the time of billing. Therefore, a store clerk can confirm that the person carrying the mobile phone 2 is the legitimate user only in the case where the displayed face image matches the face of the person and the indicator 25 is on at the same time. Consequently, the indicator 25 is not turned on by simply displaying a photographed face image or displaying a face image by application software other than the authentication software. As a result, the store clerk can confirm that the person is not the legitimate user of the mobile phone 2. In this manner, use of e-money by a third person pretending to be the legitimate user can be prevented.

Furthermore, the face image is sent from the mobile phone 2 to the authentication server 3, and the authentication server 3 judges whether the face image satisfies all the conditions (1) through (5). Therefore, an image inappropriate as an image for authentication can be prevented from being stored in the specific area in the internal memory 19 and from being used for authentication of the legitimate user at the time of billing.

In addition, the face image is sent from the mobile phone 2 to the authentication server 3, and the authentication server 3 processes the face image so that the face image satisfies the condition(s) (1) and/or (4) in the case where the face image does not satisfy the condition(s) (1) and/or (4). The processed face image is then sent from the authentication server 3 to the mobile phone 2. Therefore, an image inappropriate as an image for authentication can be prevented from being stored in the specific area in the internal memory 19 and from being used for authentication of the legitimate user at the time of billing.

In the embodiment described above, the indicator 25 is turned on at the time of billing. However, as long as operation of the authentication software can be notified, any manner such as an audio message notifying the user being the legitimate user or display of a message on the LCD monitor 13 can be used.

In the embodiment described above, the authentication server 3 has the judgment unit 35 and the processing unit 37 for judging whether the face image received from the mobile phone 2 satisfies the conditions (1) through (5) and for processing the face image in the case where the face image does not satisfy the condition(s) (1) and/or (4). However, in some cases, the user of the mobile phone 2 may photograph the face image satisfying all the conditions (1) through (5) with certainty. Therefore, without sending the face image from the mobile phone 2 to the authentication server 3 and without the judgment unit 35 and the processing unit 37 in the authentication server 3, the authentication apparatus may carry out the authentication only by the password. In this case, the face image temporarily stored in the internal memory 19 is immediately stored in the specific area at the time the user has been authenticated.

In the embodiment described above, the user needs to hold the mobile phone 2 close to the information reading writing unit 45 of the billing apparatus 4 until the billing procedure ends. However, the user may bring the mobile phone 2 once close to the information reading writing unit 45 of the billing apparatus 4 for display of the face image and turning on the indicator 25. In this case, the billing procedure can be carried out by holding the mobile phone 2 close to the information reading writing unit 45 again after a store clerk confirms the user.

In the embodiment above, the face image is stored in the specific area of the internal memory 19. However, a memory accessible only by the authentication software may be installed separately from the internal memory 19 so that the face image can be stored therein.

What is claimed is:

1. An authentication system comprising a mobile terminal having an e-money function, an authentication apparatus carrying out user authentication regarding the mobile terminal, and a billing apparatus carrying out billing by using the mobile terminal, the mobile terminal comprising:

imaging means for obtaining an image of a subject by photography;
first storage means where c-money information is read from and written in by information reading writing means carrying out reading and writing of the e-money information;
mobile terminal communication means for carrying out various kinds of communication;
mobile terminal input means for receiving input of various kinds of instructions by a user;
mobile terminal display means for carrying out various kinds of display;
second storage means accessible only by predetermined application software;
warning means for carrying out warning through detection of the information reading writing means by the predetermined application software; and
mobile terminal control means for allowing photography of the user by the imaging means and input of a password, for sending the password to the authentication apparatus, for storing a photographed image in the second storage means in the case where the authentication apparatus has authenticated the user, for displaying the photographed image stored in the second storage means on the display means for carrying out the warning by the warning means in the case where the control means has detected the information reading writing means, according to the predetermined application software;
the authentication apparatus comprising:
authentication apparatus communication means for carrying out various kinds of communication; and
authentication apparatus control means for carrying out authentication of a person carrying the mobile terminal by the password in the case where the password has been received from the mobile terminal, and for sending information representing a result of the authentication to the mobile terminal;
the billing apparatus comprising:
billing apparatus input means for inputting various kinds of information;
the information reading writing means for reading and writing the e-money information from and in the mobile terminal; and
control means for carrying out billing based on the e-money information only in the case where input for allowing the billing is received from the billing apparatus input means.

2. A mobile terminal comprising:
imaging means for obtaining an image of a subject by photography;
first storage means where e-money information is read from and written in by information reading writing means carrying out reading and writing of the e-money information;
mobile terminal communication means for carrying out various kinds of communication;
mobile terminal input means for receiving input of various kinds of instructions by a user;
display means for carrying out various kinds of display;
second storage means accessible only by predetermined application software;
warning means for carrying out warning through detection of the information reading writing means by the predetermined application software; and
control means for allowing photography of the user by the imaging means and input of a password, for sending the password to the authentication apparatus by using the communication means, for storing a photographed image in the second storage means in the case where the authentication apparatus has authenticated the user, for displaying the photographed image stored in the second storage means on the display means for carrying out the warning by the warning means in the case where the control means has detected the information reading writing means, according to the predetermined application software.

3. The mobile terminal according to claim 2, wherein the control means send the image to the authentication apparatus and stores the image in the second storage means in the case where the authentication apparatus has judged the image to satisfy a predetermined condition.

4. The mobile terminal according to claim 2, wherein the control means sends the image to the authentication apparatus and stores a processed image having been processed by the authentication apparatus so as to satisfy a predetermined condition in the second storage means in the case where the processed image has been received from the authentication apparatus.

5. An authentication apparatus comprising:
communication means for carrying out various kinds of communication; and
control means for carrying out authentication of a person carrying a mobile terminal by a password in the case where the password has been received from the mobile terminal and for sending information representing a result of the authentication to the mobile terminal, the mobile terminal comprising imaging means for obtaining an image of a subject by photography, first storage means where e-money information is read from and written in by information reading writing means carrying out reading and writing of the e-money information, communication means for carrying out various kinds of communication, input means for receiving input of various kinds of instructions by a user, display means for carrying out various kinds of display, second storage means accessible only by predetermined application software, warning means for carrying out warning through detection of the information reading writing means by the predetermined application software, and control means for allowing photography of the user by the imaging means and input of the password, for sending the password to the authentication apparatus by using the communication means, for storing a photographed image in the second storage means in the case where the authentication apparatus has authenticated the user, for displaying the photographed image stored in the second storage means on the display means for carrying out the warning by the warning means in the case where the control means has detected the information reading writing means, according to the predetermined application software.

6. The authentication apparatus according to claim 5, further comprising judgment means for carrying out judgment as to whether a predetermined first condition is satisfied by an image obtained by photography of the person carrying the mobile terminal in the case where the image has been received from the mobile terminal and for sending information representing a result of the judgment to the mobile terminal.

7. The authentication apparatus according to claim 5, further comprising processing means for processing an image obtained by photography of the person carrying the mobile terminal so that the image satisfies a predetermined second condition in the case where the image has been received from the mobile terminal and for sending the image having been processed to the mobile terminal.

8. A billing apparatus comprising:
input means for inputting various kinds of information;
information reading writing means for reading and writing e-money information from and in a mobile terminal comprising imaging means for obtaining an image of a subject by photography, first storage means where e-money information is read from and written in by information reading writing means carrying out reading and writing of the e-money information, communication means for carrying out various kinds of communication, input means for receiving input of various kinds of instructions by a user, display means for carrying out various kinds of display, second storage means accessible only by predetermined application software, warning means for carrying out warning through detection of the information reading writing means by the predetermined application software, and control means for allowing photography of the user by the imaging means and input of the password, for sending the password to the authentication apparatus by using the communication means, for storing a photographed image in the second storage means in the case where the authentication apparatus has authenticated the user, for displaying the photographed image stored in the second storage means on the display means for carrying out the warning by the warning means in the case where the control means has detected the information reading writing means, according to the predetermined application software; and
billing means for carrying out billing based on the e-money information in the case where input for allowing the billing is received from the input means of the billing apparatus.

9. A processing method carried out in a mobile terminal having imaging means for obtaining an image of a subject by photography, first storage means where e-money information is read from and written in by information reading writing means carrying out reading and writing of the e-money information, mobile terminal communication means for carrying out various kinds of communication, mobile terminal input means for receiving various kinds of instructions by a user, display means for carrying out various kinds of display, second storage means accessible only by predetermined application software, and warning means for carrying out warning through detection of the information reading writing means by the predetermined application software, the processing method comprising the steps of:
allowing photography of the user by the imaging means and input of a password;
sending the password to the authentication apparatus;
storing the photographed image in the second storage means in the case where the authentication apparatus has authenticated the user;
displaying the image stored in the second storage means on the display means and carrying out the warning by the warning means in the case where the information reading writing means has been detected, according to the predetermined application software.

10. An authentication method for an authentication apparatus having communication means for various kinds of communication, the authentication method comprising the steps of:
carrying out authentication of a person carrying a mobile terminal by a password in the case where the password has been received from the mobile terminal, the mobile terminal having imaging means for obtaining an image of a subject by photography, first storage means where e-money information is read from and written in by information reading writing means carrying out reading and writing of the e-money information, communication means for carrying out various kinds of communication, input means for receiving input of various kinds of instructions by a user, display means for carrying out various kinds of display, second storage means accessible only by predetermined application software, warning means for carrying out warning through detection of the information reading writing means by the predetermined application software, and control means for allowing photography of the user by the imaging means and input of the password, for sending the password to the authentication apparatus by using the communication means, for storing a photographed image in the second storage means in the case where the authentication apparatus has authenticated the user, for displaying the photographed image stored in the second storage means on the display means for carrying out the warning by the warning means in the case where the control means has detected the information reading writing means, according to the predetermined application software; and sending information representing a result of the authentication to the mobile terminal.

11. A billing method for a billing apparatus having input means for inputting various kinds of information, information reading writing means for reading and writing e-money information from and in a mobile terminal imaging means for obtaining an image of a subject by photography, first storage means where e-money information is read from and written in by information reading writing means carrying out reading and writing of the e-money information, communication means for carrying out various kinds of communication, input means for receiving input of various kinds of instructions by a user, display means for carrying out various kinds of display, second storage means accessible only by predetermined application software, warning means for carrying out warning through detection of the information reading writing means by the predetermined application software, and control means for allowing photography of the user by the imaging means and input of the password, for sending the password to the authentication apparatus by using the communication means, for storing a photographed image in the second storage means in the case where the authentication apparatus has authenticated the user, for displaying the photographed image stored in the second storage means on the display means for carrying out the warning by the warning means in the case where the control means has detected the information reading writing means, according to the predetermined application software, the billing method comprising the step of:

carrying out billing based on the e-money information in the case where input for allowing the billing is received from the input means of the billing apparatus.

* * * * *